(12) United States Patent
Dubner

(10) Patent No.: US 8,516,744 B2
(45) Date of Patent: Aug. 27, 2013

(54) MODULAR INTERLOCKING PRE-VEGETATED ROOF SYSTEM

(75) Inventor: Steven Dubner, Woodbury, NY (US)

(73) Assignee: Metro Green Visions, Inc., Dix Hills, NY (US)

( * ) Notice: Subject to any disclaimer, the term of this patent is extended or adjusted under 35 U.S.C. 154(b) by 0 days.

(21) Appl. No.: 13/526,999

(22) Filed: Jun. 19, 2012

(65) Prior Publication Data

US 2012/0255225 A1 Oct. 11, 2012

Related U.S. Application Data

(62) Division of application No. 12/704,726, filed on Feb. 12, 2010.

(51) Int. Cl.
*A01G 9/02* (2006.01)

(52) U.S. Cl.
USPC .................................. 47/66.7; 47/65.9; 47/86

(58) Field of Classification Search
USPC ................... 47/85, 65.5, 65.9, 66.1, 66.3, 73, 47/79, 76, 1.01 F, 32.7, 33, 77
See application file for complete search history.

(56) References Cited

U.S. PATENT DOCUMENTS

| | | | | |
|---|---|---|---|---|
| 5,187,894 A * | 2/1993 | Ripley et al. | .................. | 47/86 |
| 5,309,846 A * | 5/1994 | Peterson | .................. | 108/53.3 |
| 5,467,555 A * | 11/1995 | Ripley et al. | .................. | 47/65.9 |
| 5,595,021 A * | 1/1997 | Ripley et al. | .................. | 47/66.5 |
| 6,134,834 A * | 10/2000 | Ripley et al. | .................. | 47/86 |
| 6,263,616 B1 * | 7/2001 | Hummer | .................. | 47/65.9 |
| 2008/0168710 A1 * | 7/2008 | MacKenzie | .................. | 47/65.9 |
| 2010/0064580 A1 | 3/2010 | Irwin | | |
| 2011/0030274 A1 * | 2/2011 | Buist | .................. | 47/65.6 |

OTHER PUBLICATIONS

American Hydrotech, Inc. "Garden Roof—Green Roof Components" & "Extensive Green Roof—Garden Roof Assembly". Copyrighted 1996-2009. www.hydrotechusa.com.
Eco Innovations, Inc. (d/b/a Green Roof Tops) "G-SKY: Extensive Green Roof". G-SKY Master Specification, Version 3.14. Dec. 2005. pp. 1-25. www.greenrooftops.com.
Liveroof, LLC. "Liveroof System: Prevegetated Invisible-Modular Green Roof System". (33 Pages) www.liveroof.com, Dec. 18, 2009.
Weston Solutions, Inc. "Greengrid: The Premier Green Roof System". Copyrighted 2008. (38 pages) www.greengridroofs.com.
Xeroflor America, Inc. "Xero Flor Green Roof Systems". Copyrighted 2008. (4 Pages) www.xeroflora.com/system.html.
Xeroflor America, Inc. "Xero Flor Pre-Cultivated Green Roof System Specifications". Technical Sheets. Copyrighted 2008. (8 Pages) http://www.xeroflora.com/techsheets.html.

* cited by examiner

*Primary Examiner* — Kristen C Hayes
(74) *Attorney, Agent, or Firm* — Tutunjian & Bitetto, P.C.

(57) ABSTRACT

A modular unit, system and method include a base layer having a plurality of reservoirs configured to prevent water flow through a lower portion, the lower portion for contacting a support surface, and having interlocking portions configured to interlock adjacent base layers when installed. A water permeable layer is disposed over the base layer. A detachable wall is mountable on the base layer to contain planting media. The water permeable layer may include a water-holding capillary fabric mat layer with entangled filaments.

20 Claims, 9 Drawing Sheets

MODULAR INTERLOCKING PRE-VEGETATED ROOF SYSTEM

CROSS-REFERENCE TO RELATED APPLICATIONS

This application is a Divisional of U.S. patent application Ser. No. 12/704,726 filed on Feb. 12, 2010, which was entitled "Modular Interlocking Pre-Vegetated Roof System", incorporated herein by reference in its entirety.

BACKGROUND

1. Technical Field

The present invention relates to green roof technology and more particularly to a modular interlocking system which provides pre-vegetated units for building rooftops.

2. Description of the Related Art

Green roofs include a system of manufactured layers placed over rooftops to support growing medium and vegetation. Green roofs or sod roofs have been around for centuries. With the effects of global warming, pollution and other modern environmental issues, a renewed trend has begun for green roofs.

Many green roofs are installed to and need to comply with local regulations, often regarding storm water runoff management. In areas with combined sewer-storm water systems, heavy storms can overload the wastewater system and cause it to flood, dumping raw sewage into the local waterways. Green roofs decrease the total amount of runoff and slow the rate of runoff from the roof. It has been found that they can retain up to 75% of rainwater, gradually releasing it back into the atmosphere via condensation and transpiration, while retaining pollutants in their soil. In this way, green roofs can buffer acid rain and other pollutants. An issue that arises is how much weight can be placed on a roof as roofs have loading limitations.

Combating the urban heat island effect is another reason for creating a green roof. Traditional building materials soak up the sun's radiation and re-emit it as heat, making cities at least 4 degrees Celsius (7° F.) hotter than surrounding areas. Green roof temperatures on a hot day are typically 14-44 degrees Celsius (25-80° F.) cooler than they are on traditionally roofed buildings nearby. It has now been estimated that if all the roofs in a major city were green, urban temperatures could be reduced by as much as 7 degrees Celsius.

Green roofs have also been found to dramatically improve a roof's insulation value (e.g., one study found that a 26% reduction in summer cooling needs and a 26% reduction in winter heat losses when a green roof is used). In addition, greening a roof is expected to lengthen a roof's lifespan by two or three times because the roof's waterproofing membrane is protected from the sun's UV and quick changes in temperature. Greening a roof can also dramatically reduce indoor noise pollution, which is extremely beneficial to the quality of life in urban areas.

Rooftop water purification is also being implemented in green roofs. These forms of green roofs function as water treatment ponds built onto the rooftops. They are built either from a simple substrate or with plant-based ponds. Green roofs also provide habitats for plants, insects, and birds that otherwise have limited natural space in cities. Even in high-rise urban settings as tall as 19 stories, it has been found that green roofs can attract beneficial insects, birds, bees and butterflies. Rooftop greenery complements wild areas by providing areas for birds and other wildlife facing shortages of natural habitat.

Despite the many benefits of green roofs, it remains difficult to build gardens on rooftops. The amount of water held by the roof top garden is a major concern. A continuous bed is preferred to ensure even distribution of vegetation as well as distribute water reserves among plants. Continuous beds require soil placement on the roof with uniform and sufficient soil depth to support plant growth. In addition, moving or removing the continuous bed of soil is difficult and labor intensive. An alternative to the continuous bed is the setting of trays filled with growing media and vegetation. Tray grown plants permit the plants to be easily transported and arranged, but have many issues with water. Root rot and insufficient watering is common with plantings grown in trays. Further, planted trays on a rooftop may create a dangerous condition if the trays are not properly anchored.

Therefore, a need exists for an apparatus and system that provide for water management, easy transportability, continuous bed advantages and controlled soil heights and weight characteristics, root entanglement for erosion control, along with the ability to remove segments for service to the roof. A further need exists for a system that provides an economical means of installation and establishment of a green extensive roof.

SUMMARY

A modular unit, system and method include a base layer having a plurality of reservoirs configured to prevent water flow through a lower portion, the lower portion for contacting a support surface, and having interlocking portions configured to interlock adjacent base layers when installed. A water permeable layer is disposed over the base layer. A detachable wall is mountable on the base layer to contain planting media.

A modular interlocking green roof system includes a plurality of modular units. Each modular unit includes a base layer having a plurality of reservoirs configured to prevent water flow through a lower portion of the reservoirs, the lower portion for contacting a support surface, and interlocking portions configured to interlock one or more adjacent base layers when installed. A water permeable layer is disposed over the base layer, and detachable walls are mountable on the base layer to contain planting media. The modular units include pre-vegetated soil disposed on the water permeable layer and the units are interconnected to each other using the interlocking portions such that upon installation the detachable wall are removed to permit a continuous soil bed over the modular units.

A method for installing a green roof system includes providing a plurality of modular units, each including a base layer having a plurality of reservoirs configured to prevent water flow through a lower portion of the reservoirs, the lower portion for contacting a support surface, and interlocking portions configured to interlock one or more adjacent base layers when installed; a water permeable layer for placement over the base layer; and detachable walls mountable on the base layer to contain planting media; placing the water permeable layer on the base layer of the units; installing the walls on the base layer of the units; filling the space between the walls on the units with planting media; establishing vegetation in the planting media; transporting the units to a roof location; interlocking the units using the interlocking portions in a coverage area of the roof; and removing the detachable walls to form a continuous bed over the water permeable layers. The water permeable layer may include a capillary fabric mat layer having entangled polymer filaments thermally bonded thereto.

A multi-component water management system provides for the distribution and storage of water for vegetation and removal of excess water. A composite mat is employed to regulate moisture content through diffusion and capillary movement. Water from precipitation (or watering) is collected first in the mat and then in the base layer (reservoirs or pockets). Excess water drains through a series of holes in channels formed in the base layer into a void space under the base layer. Water stored in the pockets can move up into the mat using capillary movement, evaporation, or condensation. The mat may include a layer of entangled filaments to spread moisture, aerate planting media and provide stability to the planting media.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, a modular interlocking unit for green roofs is provided. The unit includes interlocking features on its base layer or panel which connect with adjacent units when installed, and can nest with each other during shipment. The base layer receives removable wall structures which provide soil support during shipment. The base and walls may be assembled and filled with soil and other materials and may be planted before being shipped and placed on a roof. Once in place, the units are interlocked and the walls may be removed to permit the formation of a continuous bed on top of a plurality of interlocked bases.

The base includes a corrugated or egg carton construction having a plurality of water reservoirs. The reservoirs are connected at an intermediate height with channels such that water accumulation is permitted to the intermediate height; however, upon water levels reaching the channels, the water is directed toward a drain or weep hole. This provides for water retention in the reservoir, without saturation of water near the plant roots, which could otherwise cause rotting.

As will be appreciated by one skilled in the art, aspects of the present invention may be embodied as a system, kit, apparatus or method for making a removal roof bed. The systems and kits may include any combination of components in accordance with the present principles. Although components of a particular shape and size are depicted and described, these configurations should not be construed as limiting and the present principles can be implements in a plurality of different shapes, sizes and configurations.

Figure 1:
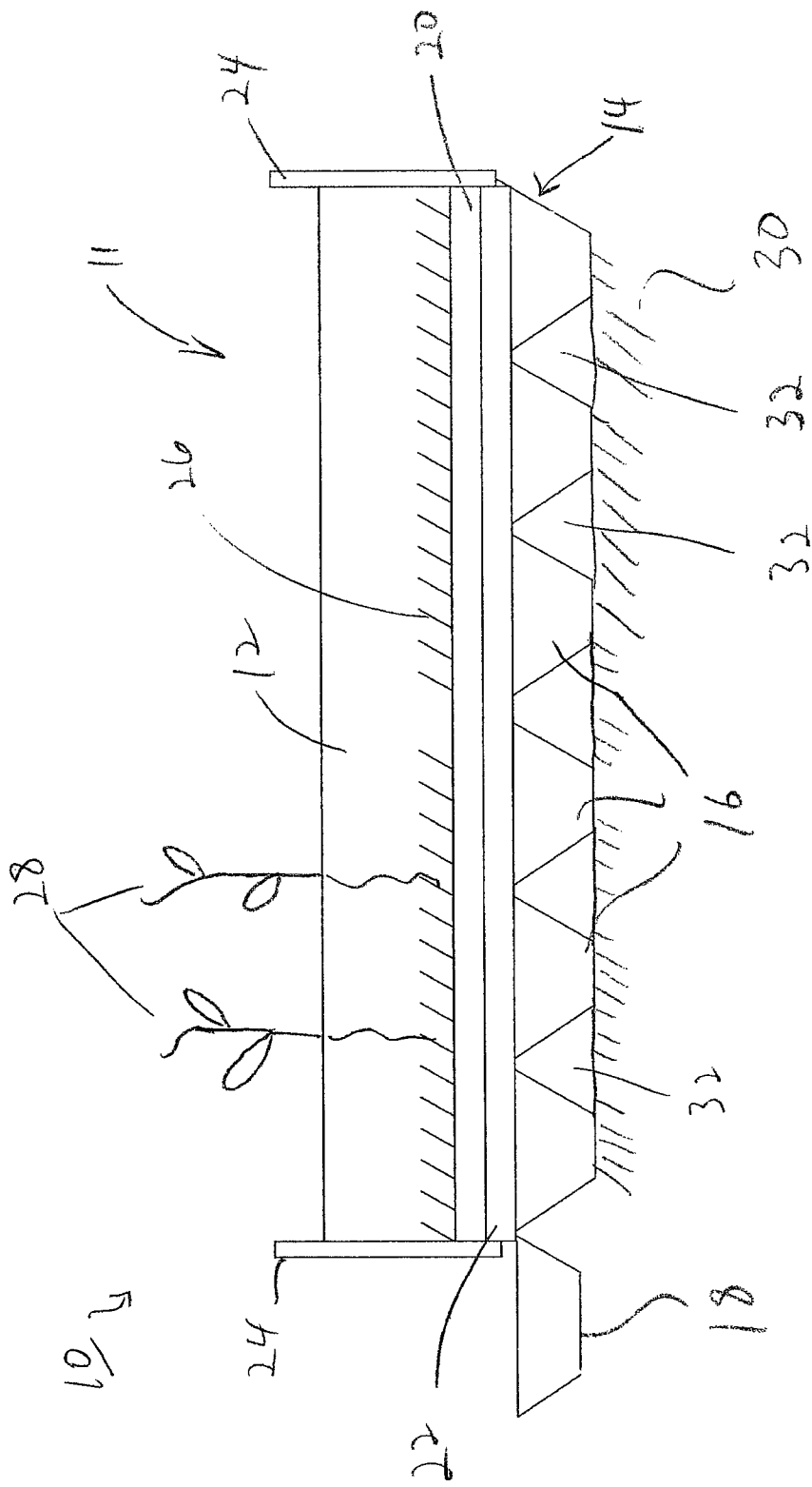
FIG. 1 is a cross-sectional diagram showing a pre-vegetated modular unit in accordance with one embodiment.

Referring now to the drawings in which like numerals represent the same or similar elements and initially to FIG. 1, a modular interlocking system 10 includes a plurality of individually assembled units 11. Each unit 11 is sized to permit easy loading and storage (e.g., in a greenhouse) for transport to a roof or other location where the units 11 will be assembled. The unit 11 includes a base layer 14. Base layer 14 includes a plurality of egg carton or cup-like features 16. Features 16 are preferably formed in a repeating pattern across the layer 14.

Features 16 may be formed from a polymer material or other light-weight material capable of being molded and for holding water within a cup-like reservoir formed by the feature 16. Base layer 14 includes an interlocking portion 18 that is configured to receive a feature 16 from an adjacent base layer 14 of another unit 11.

Unit 11 includes a water and air permeable barrier layer 20 which is configured to permit water to reach the reservoirs formed by features 16. An optional aeration layer 22 may also be included. It should be noted that additional layers and materials may also be added to the structure of unit 11 including additional aeration layers, fertilizer layers, etc.

Removable walls 24 are attachable to portions of the base layer 14. Walls 24 are of lightweight construction and are provided to hold soil or other substrate material 12 in place. A filament layer 26 may be provided to provide plant roots an anchoring location and to assist in maintaining a stable soil layer. The filament layer 26 may includes entangled filaments, which are preferably formed from a polymer with hydrophilic properties, such as e.g., nylon. Hydrophilic properties of the nylon entangled filament also help regulate and retain moisture for a lower portion of the planting media. The filament holds the soil in place and helps prevent soil erosion on both level and moderately sloped roofs. The filament also acts as an anchor for roots, especially for newly established plantings on the roof. The filaments help in the aeration of the soil by preventing the soil from compacting. The filaments also create a channel for capillary action of moisture upward into the soil or downward drainage. In addition to the aforementioned attributes, the filament also helps prevent the shearing of soil on a moderately sloped roof where the soil has become frozen.

Unit 11 is depicted in FIG. 1 in an assembled form. The form depicted would be a configuration stored in a green house for growing plants 28 within the unit 11. In this way, the unit 11 may be delivered to a roof site or other location pre-vegetated.

In one embodiment, unit 11 may include an 18 inch by 18 inch footprint, although any sized footprint may be employed. The 18" by 18" footprint provides a good amount of coverage area while maintaining a reasonable weight so that the unit 11 may be easily transported by a worker or other individual.

Each unit 11 includes facilities for drainage, water storage, water retention, air circulation, filtration, root stabilization, aeration of planting media, root inhibiting, engineered lightweight soil, moisture distribution, and established vegetation.

The inclusion of these elements in one unit results in the efficient installation of an extensive green roof. Benefits from this system include the reduction of labor costs for the initial installation and future maintenance of the green roof. A pre-vegetated roof reduces cost for time needed for weeding during the established period of one to two years that is desirable for a grown in place roof system, started by plugs, cuttings or seed. The pre-vegetated unit 11 helps prevent any erosion caused by wind or rain that is common with a grown in place system. During installation, the unit 11 is carried to a roof location and set on a waterproofed roof designed for a green roof installation. As mentioned throughout, the roof or roof location includes any suitable location where the modular units can be placed.

Figure 2:
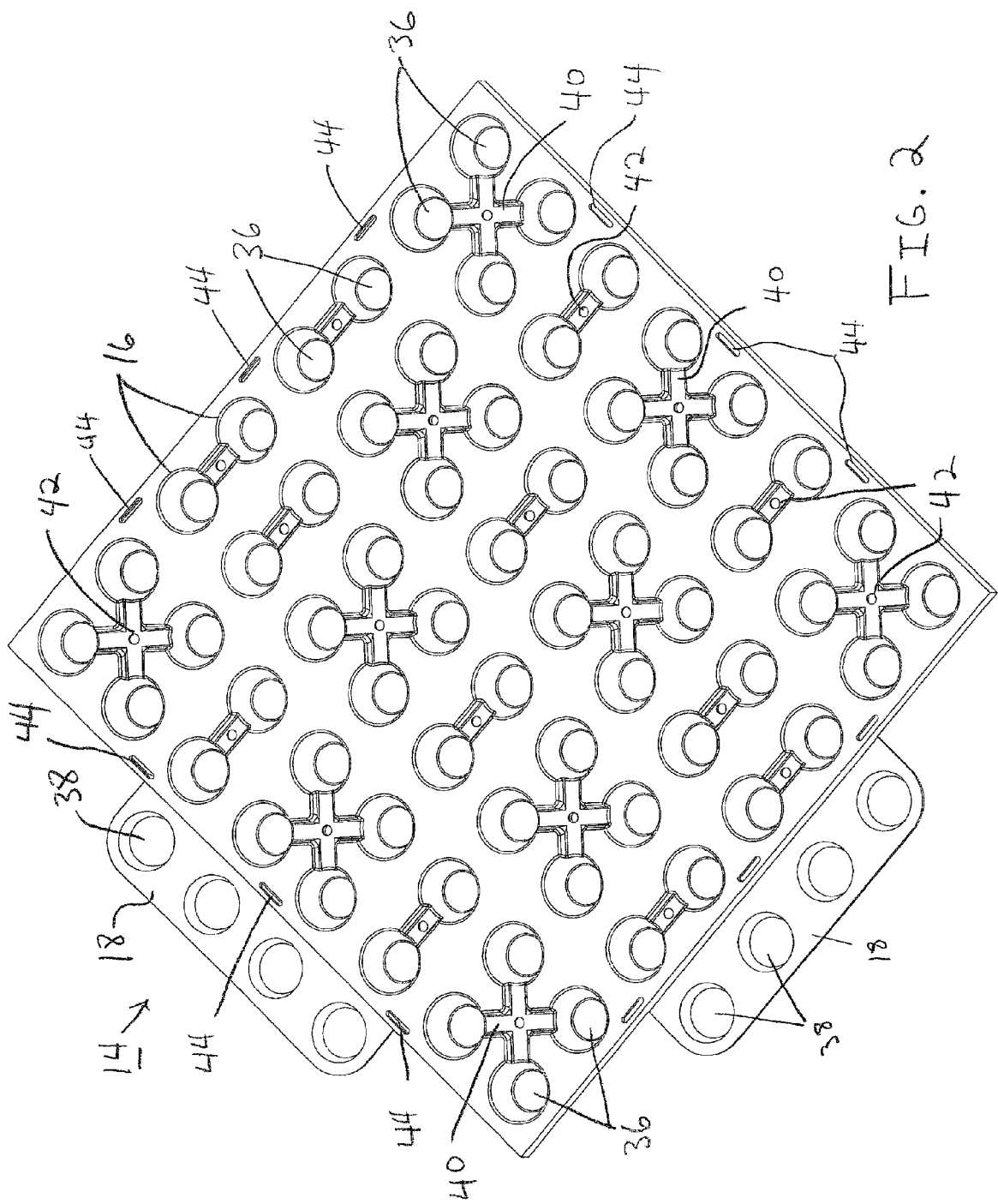
FIG. 2 is a perspective view of a base layer/panel in accordance with one embodiment.

Referring to FIG. 2, the rigid base layer 14 is shown in greater detail. Base layer 14 may be constructed from recycled materials (e.g., recycled polypropylene, or other materials). This layer 14 includes a plurality of reservoirs 36 formed in features 16 to store water. Channels 40 are formed between interconnected groupings of water reservoirs 36. The interconnected groupings of reservoirs 36 may include any number of reservoirs 36 connected through channels 40. For example, a greater number of reservoirs 36 may be connected at ends of the array of units 11. The channels 40 between reservoirs 36 may be criss-crossed into an "X" shape, include a straight line, L-shape or any other configurations.

The channels 40 permit the flow of excess water between the reservoirs 36 and into weep holes 42, which are formed at a central location in the channels 40. The weep holes 42 also permit for air circulation therethrough. This air circulation helps prevent root rot which has been a problem for other systems. Weep holes 42 may be employed in other configurations including multiple holes at or near a single location along the channels 40. It should be understood that each reservoir 36 may include a plurality of channels 40 connecting to a plurality of reservoirs 36.

The size of reservoirs 36 can be designed to store more or less water as the particular conditions permit in a given clime, conditions or environment. Specific areas of the system can have the reservoirs 36 filled with an inert lightweight material where less water is needed to be stored, or water retention materials may be placed in the reservoirs 36 to reduce evaporation and store the water for a longer period of time.

Figure 3:
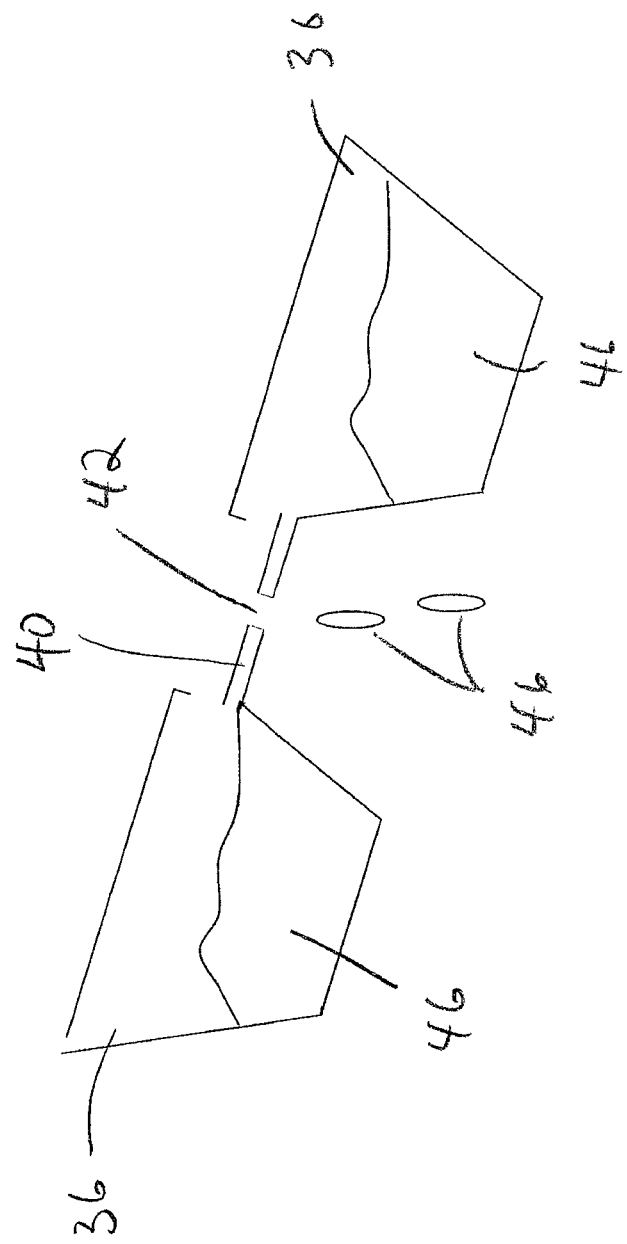
FIG. 3 is a cross-sectional diagram showing reservoirs maintaining water under sloped conditions in accordance with the present principles.

Referring to FIG. 3, a cross-sectioned section of base layer 14 is illustratively depicted to show water retention in reservoirs 36 on a sloped surface. Several reservoirs 36, which are connected by channels 40, form a grouping where water is encapsulated. This is advantageous where the system is installed on a modestly sloped roof of, e.g., 1% to 15% slope, larger or smaller slopes are also contemplated. This prevents the flow of water 46 from one group to the adjoining group of reservoirs 36 and provides for an even distribution of water 46 within the total system. This advantageously prevents the stored water from completely flowing to the lowest elevation of the roof. This and other features are lacking in other continuous bed systems and planted tray configurations.

Figure 4:
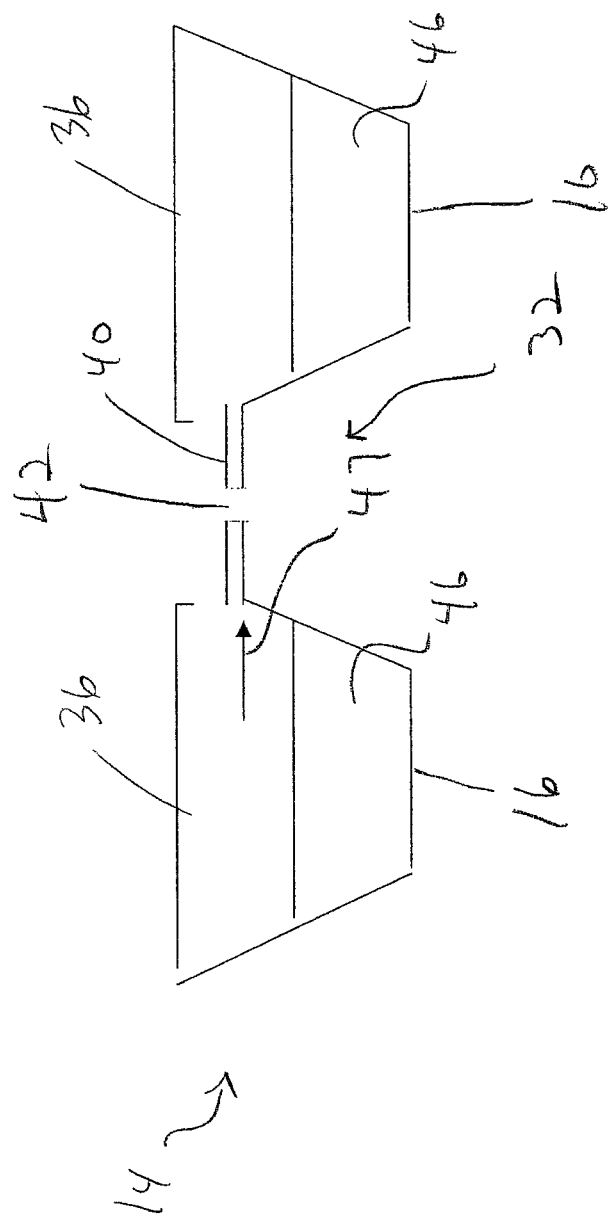
FIG. 4 is a cross-sectional diagram showing reservoirs maintaining water in accordance with the present principles.

Referring to FIG. 4, a cross-sectioned section of base layer 14 is illustratively depicted to show water retention in reservoirs 36 on a flat surface. Several reservoirs 36 are connected by channels 40 to form a grouping. This stores water 46 within each reservoir 36 below a channel depth 47. Soil is prevented from entering reservoirs 36 by employing a water permeable barrier (20) or mat over the base layer 14. As water accumulates in the reservoirs 36, the water 46 reaches the height 47 of the channel 40. Water 46 flows through the channels and is drained by weep hole or holes 42. Water 46 is then free to flow through spaces 32 formed between the bottom of features 16 and a roof or other support surface.

The reservoirs 36 provide for water storage such that during dry periods, the water can be utilized by the plant life growing in the soil above. The water is capable of wicking up through the barrier layer (20) as a result of evaporation from the reservoirs 36. In one embodiment, wicks or other media may be provided in reservoirs to provide additional water carrying capabilities. For example, fertilizers, minerals, water retention media, wicking media or other materials may be provided in reservoirs 36. Advantageously, by employing the channels 40 and weep holes 42, an upper portion of the reservoir 36 is drained thereby permitting aeration and reducing any risk of local root rot or soil stagnation. Channels 40 are preferably opened-top channels although closed channels (tubes) may also be employed.

Referring again to FIG. 2, each base layer 14 includes interlocking portions 18 on one or more sides of the base layer 14. Interlocking portions 18 on two sides is preferable. Interlocking portions 18 form a hole 38 configured to receive the bottom of a reservoir 36 of an adjacent panel or base layer 14. It should be understood that other configurations for the interlocking portions 18 may be employed. Interlocking portions 18 prevent shifting of the base layers or panels 14 after installation, and simplify the initial installation of the green roof. It should be understood that the base panels 14 can be cut to size at an installation site to provide a custom fit to the roof where the system is being installed.

The interlocking portions 18 further permit adjoining panels or base layers 14 to be installed in a staggered system in one direction (i.e., running bond pattern), although interlocking portions 18 may be installed on a portion of each of the four sides. The base layer panels 14 are easily removed to provide easy access to the roof below, which may be needed for roof servicing. The under portion of the base layer 14 permits excess water to flow under the base layer 14 in spaces 32 between the layer 14 and a roof 30 (FIG. 1). Spaces 32 permit water flow to portals or roof drainage systems, without obstruction. Layer 14 includes slots 44 or other features placed at intervals for simple installation of side walls 24 (FIG. 1).

Figure 5:
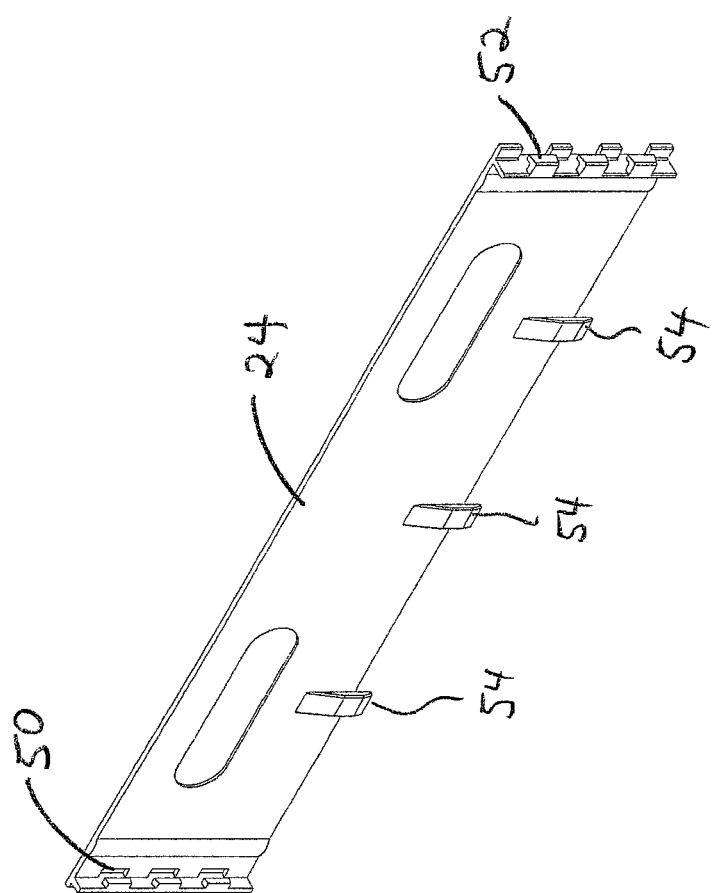
FIG. 5 is a perspective view of a detachable wall in accordance with one embodiment.

Referring to FIG. 5, side walls 24 are mountable on base layer 14. Walls 24 include tabs 54 that fit into slots 44 (FIG. 2) of the base layer 14. Walls 24 are provided along all four edges of base layer 14 to prevent the movement of soil during initial planting, plant establishment, and transportation. The sides 24 interlock with each other at the ends using slots 50 and tabs 52. Other attachment mechanisms are also contemplated. Walls 24 are designed for easy removal once the platform is set in place on the rooftop. The four corners of the assembled walls 24 are designed to stack, preventing damage to the plants during delivery. The walls 24 may also be constructed from lightweight recycled material (e.g., polypropylene) and are reusable.

A height of the walls 24 can vary based on desired depth of soil. In addition, the wall height is employed to gauge an appropriate soil height. For example, a four inch high wall limits the soil height to four inches. This is particularly advantageous in planning roof gardens where soil depth needs to be accounted for in rooftop gardens where weight restrictions are present. By pre-configuring the modular units with walls of a desired height, weight loads become predictable which contributes to the safety of a rooftop garden. In addition, the walls 24 can be replaced on installed units to aid in the removal of the modular units for roof servicing or other needs.

Figure 6:
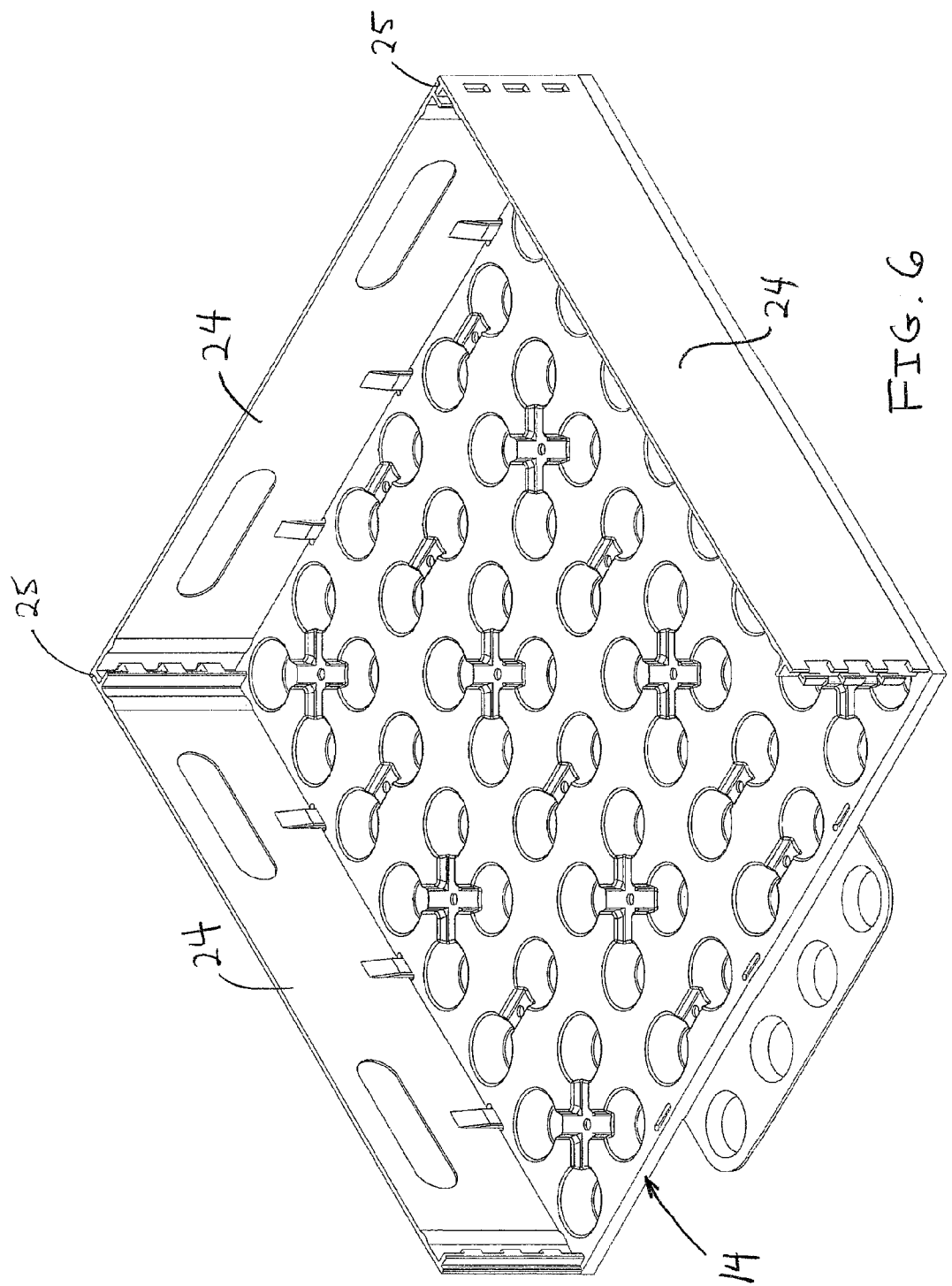
FIG. 6 is perspective view showing three detachable walls installed on a base layer in accordance with the present principles.

Referring to FIG. 6, a base layer 14 is depicted having three walls 24 mounted thereon in accordance with one illustrative embodiment. The fourth wall is removed for illustration purposes. The space between the walls 24 receives a water-holding capillary fabric mat layer. The mat layer (not shown) is preferably permeable with entangled thermally bonded polymer filaments (not shown) followed by planting media, such as soil, peat, vermiculite, sand, pumice, or other materials. An additional layer of entangled polymer filaments can be added (e.g., increased depth of the filament later is provided) when a soil depth is between, e.g., 4 inches to 8 inches. This provides aeration for a greater depth of planting media, stabilizes the depth of planting media and promotes capillary action through the greater depth. The additional layer may have the filaments on top or on the bottom, and the layers may be configured as desired. Wall edges are connected and interlocked at corners 25.

Figure 7:
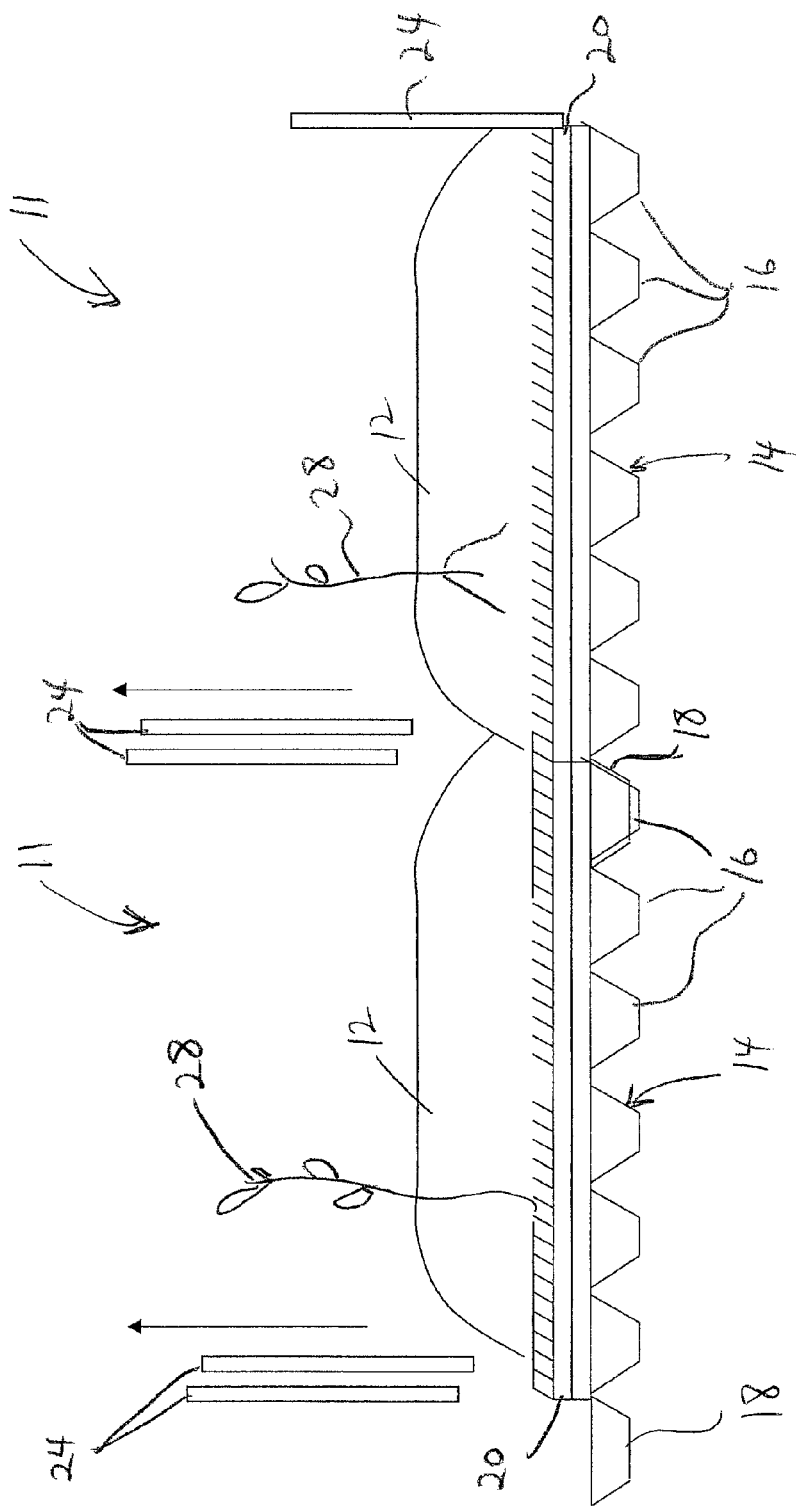
FIG. 7 is a cross-sectional diagram showing modular units interlocked at installation and the removal of detachable walls in accordance with the present principles.

Referring to FIG. 7, two base layers 14 are interlocked using interlocking portions 18. Walls 24 are removed from base layers 14 to permits for the complete interfacing of soil 12 and plants 28 from each adjoining unit 11. This provides all the attributes of a "grown-in-place" or continuous bed roof garden where there is continuity of soil drainage, and planting while still taking advantage of all of the benefits of a pre-vegetated roof system.

Advantageously, unsightly seams that may appear in other systems (trays, etc.) are no longer visible. The present modular system (10) appears as a seamless natural surface during all seasons as opposed to other systems, where the division of each tray becomes more obvious during the winter dormant season.

Figure 8:
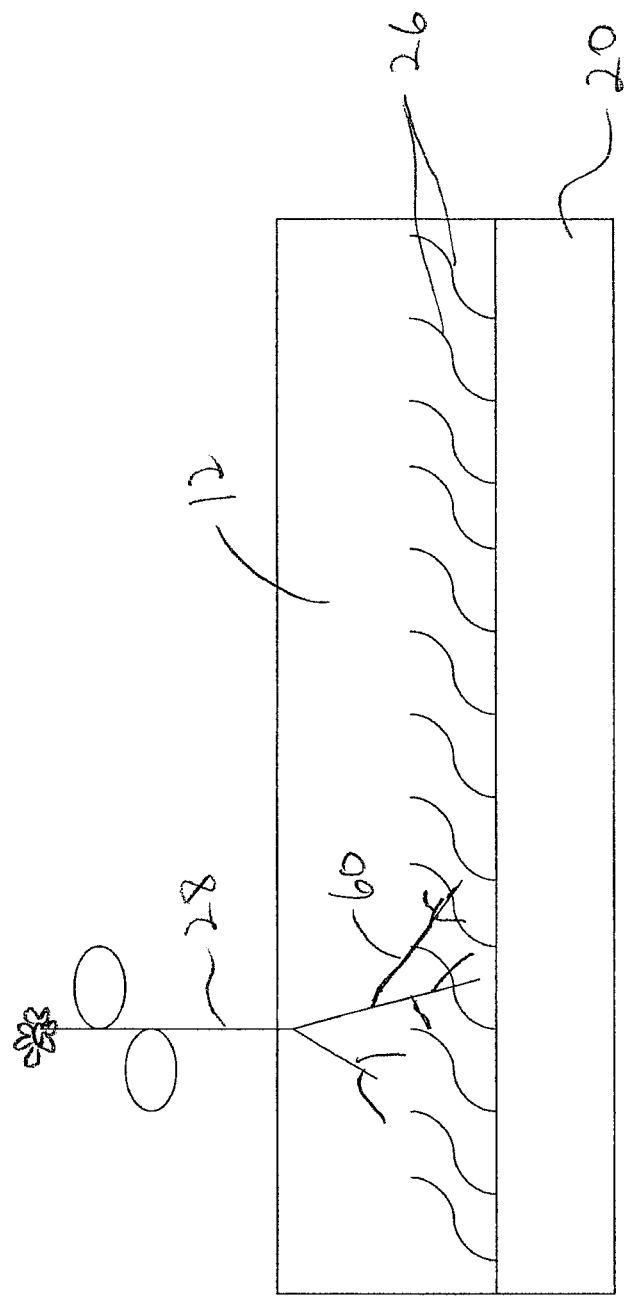
FIG. 8 is a cross-sectional diagram showing a water-holding capillary fabric mat layer that is permeable with entangled thermally bonded polymer filaments in greater detail in accordance with the present principles.

Referring to FIG. 8 with continued reference to FIG. 1, a water absorption/root stabilizer mat 20 fits between the walls 24 on top of the base layer 14 (FIG. 1). The water retention mat 20 filters the water and prevents the flow of soil that could clog the drain/weep holes 42 incorporated in the base layer 14. The absorption mat 20 absorbs moisture from the reservoirs 36 below by capillary action and by evaporation and from the water flowing through the soil above the mat 20. The mat 20 stores water and provides the water for roots of plants 28 on an as needed basis. The mat 20 may include a felt material, fabric, or other porous materials. In one embodiment, mat 20 includes recycled materials, e.g., polypropylene.

A fibrous or filament layer 26 may be formed on, formed in, connected or anchored to the mat 20. Layer 26 includes fibrous materials that assist in stabilizing the soil 12. Layer 26 provides an anchor point for roots 60 to grasp onto to prevent uprooting in windy or rainy conditions. The filament layer 26 helps to prevent the movement of soil once the panel 14 is set in place on a roof, and helps prevent the shearing of soil on a sloped roof when the soil is in a frozen condition or otherwise. The filament layer 26 further assists in preventing compaction of soil to promoting proper drainage and aeration of the soil (for plant growth and survival).

Figure 9:
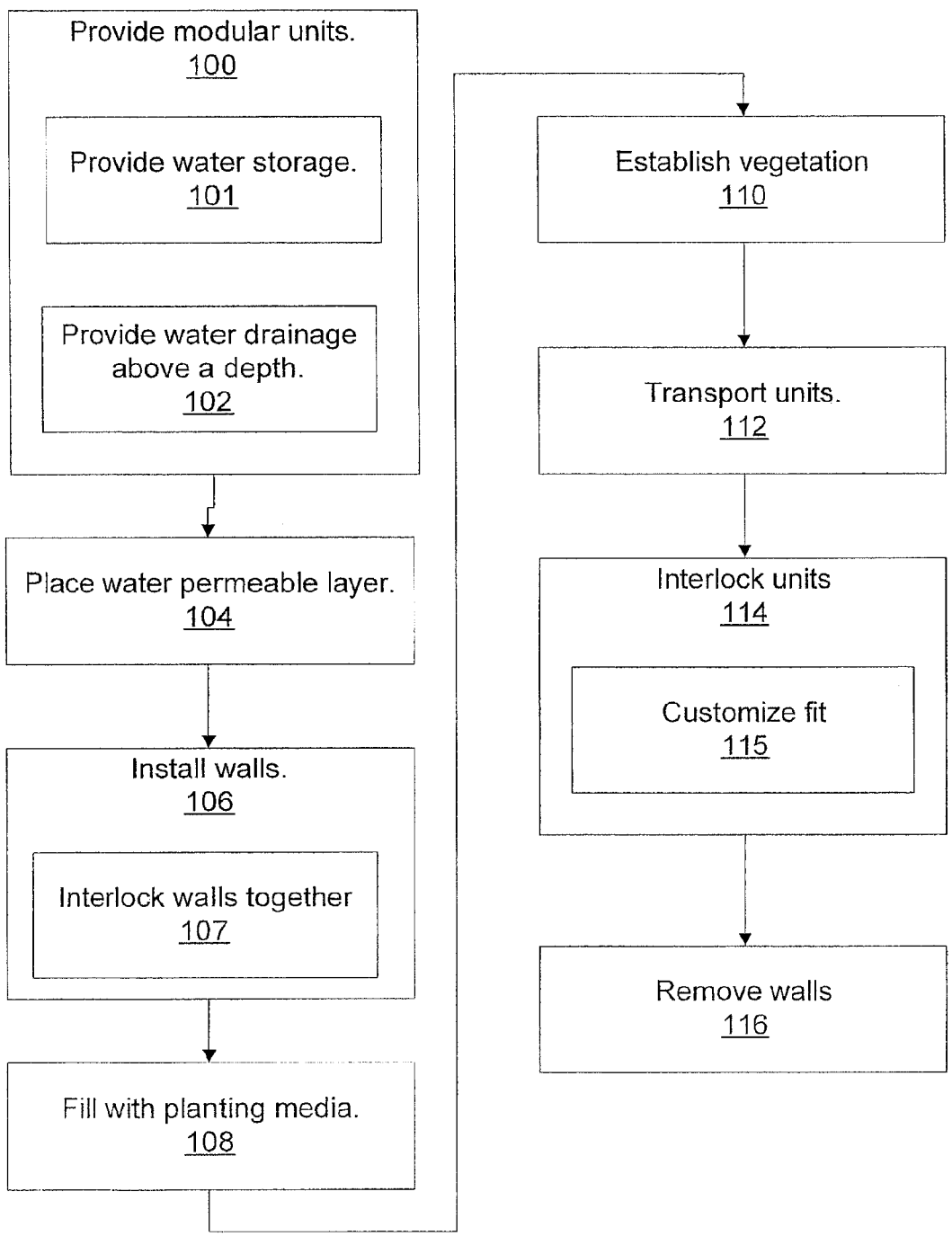
FIG. 9 is a flow chart showing a method for installing a green roof system in accordance with the present principles.

Referring to FIG. 9, a method for installing a green roof system is illustratively shown in accordance with the present principles. In block 100, a plurality of modular units is provided. Each unit includes a base layer having a plurality of reservoirs configured to prevent water flow through a lower portion of the reservoirs, the lower portion for contacting a support surface, and interlocking portions configured to interlock one or more adjacent base layers when installed; a water permeable layer for placement over the base layer; and detachable walls mountable on the base layer to contain planting media. The support surface preferably includes a roof and the lower portion of the plurality of reservoirs contacts the roof. Spaces are provided to permit water flow beneath the base layer when installed.

The base layer includes at least one channel connecting two or more reservoirs, and the at least one channel is formed at a depth communicating with an upper portion of the two or more reservoirs. In block 101, water storage capability is provided in the reservoirs below the depth. The base layer includes at least one weep hole formed in a channel connecting the two or more reservoirs. In block 102, the reservoirs provide drainage above the depth using the weep hole.

In block 104, the water permeable layer for placement over the base layer is placed on the base layer of the units. In block 106, the walls are installed on the base layer of the units. The walls are selected for a given installation in accordance with the wall height. The walls include interlocking edges which when connected help to contain the planting media, and permit stacking of the modular units for transport on installed detachable walls in block 107.

In block 108, the space between the walls on the units is filled with planting media. In block 110, vegetation is established in the planting media. Planting media and vegetation may be provided before or after installation on a roof. In block 112, the units are transported to an installation location, e.g., a roof. The units are preferably pre-vegetated in a greenhouse or other location. In block 114, the units are interlocked using the interlocking portions in a coverage area of the roof. These units may be customized to fit on the roof or other location in block 115. This may include cutting the base layers, using different sized units, etc. In block 116, the detachable walls are removed to form a continuous bed over the water permeable layer.

Although the flow chart is presented in a given order, the steps described from the method may be taken in any order. For example, the modular unit may be delivered to an installation location before adding the planting media and the plants may be grown in place at the installation location. Other combinations of steps are also contemplated.

Having described preferred embodiments of a modular interlocking pre-vegetated roof system (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for installing a green roof system, comprising:
providing a plurality of modular units, each including a base layer having a plurality of reservoirs configured to prevent water flow through a lower portion of the reservoirs, the lower portion for contacting a support surface, and interlocking portions configured to interlock one or more adjacent base layers when installed; a water permeable layer for placement over each base layer; and detachable walls mountable on each base layer to contain planting media;
placing the water permeable layer on an uppermost surface of each base layer of the units;
attaching the walls to each base layer of the units;
filling a space between the walls of the units with planting media;
establishing vegetation in the planting media;
transporting the units to an installation location;
interlocking the units using the interlocking portions in a coverage area of the installation location; and upon installation, detaching and removing the detachable walls from each base layer to form a continuous bed over the water permeable layer.

2. The method as recited in claim 1, wherein each base layer includes at least one channel connecting two or more reservoirs.

3. The method as recited in claim 2, wherein each base layer includes at least one weep hole formed in the at least one channel connecting the two or more reservoirs.

4. The method as recited in claim 2, wherein the at least one channel is formed at a depth communicating with an upper portion of the two or more reservoirs.

5. The method as recited in claim 4, the method further comprising storing water in the reservoirs below the depth.

6. The method of claim 4, the method further comprising draining the reservoirs above the depth using the weep hole.

7. The method as recited in claim 1, further comprising the step of interlocking edges of the walls to contain the planting media.

8. The method as recited in claim 1, further comprising the step of stacking of the modular units for transport on installed detachable walls.

9. The method as recited in claim 1, wherein the lower portion of the plurality of reservoirs contacts the support surface, the method further comprising the step of providing spaces to permit water flow beneath the base layer when installed.

10. The method as recited in claim 1, wherein the water permeable layer includes a water-holding capillary fabric mat layer with entangled filaments.

11. A method for installing a green roof system, comprising:
    providing a plurality of modular units, each including a base layer having a plurality of reservoirs configured to prevent water flow through a lower portion of the reservoirs, the lower portion for contacting a support surface, and interlocking portions configured to interlock one or more adjacent base layers when installed; a water permeable layer for placement over each base layer; and detachable walls mountable on each base layer to contain planting media, wherein each base layer includes at least one channel connecting two or more reservoirs;
    placing the water permeable layer on an uppermost surface of the base layer of the units;
    attaching the walls to the base layer of each units;
    interlocking the units using the interlocking portions in a coverage area of an installation location; and
    upon installation, detaching and removing the detachable walls from each base layer to form a continuous bed over the water permeable layer.

12. The method as recited in claim 11, wherein the at least one channel is formed at a depth communicating with an upper portion of the two or more reservoirs, the method further comprising storing water in the reservoirs below the depth.

13. The method of claim 11, wherein after the step of placing the water permeable layer on each base layer and prior to the step of installing the walls, further comprising the step of placing a filament layer on the water permeable layer.

14. The method of claim 11, wherein after the step of installing the walls and prior to the step of interlocking the units, further comprising the steps of:
    filling a space between the walls on the units with planting media;
    establishing vegetation in the planting media; and
    transporting the units to an installation location.

15. The method as recited in claim 11, wherein each base layer includes at least one weep hole formed in the at least one channel connecting the two or more reservoirs.

16. The method of claim 15, the method further comprising the step of draining the reservoirs above the depth using the weep hole.

17. A method for installing a green roof system, comprising:
    providing a plurality of modular units, each including a base layer having a plurality of reservoirs configured to prevent water flow through a lower portion of the reservoirs, the lower portion for contacting a support surface, and interlocking portions configured to interlock one or more adjacent base layers when installed; a water permeable layer for placement over each base layer; and detachable walls directly and removably affixed to at least a top surface of each base layer to contain planting media;
    placing the water permeable layer on an uppermost surface of each base layer of the units;
    attaching the walls to each base layer of the units;
    filling a space between the walls on the units with planting media;
    establishing vegetation in the planting media;
    transporting the units to an installation location;
    interlocking the units using the interlocking portions in a coverage area of the installation location;
    upon installation, detaching and removing the detachable walls from each base layer to form a continuous bed over the water permeable layer.

18. The method of claim 17, wherein the continuous bed comprises a complete interfacing between the plurality of modular units.

19. The method of claim 18, wherein the complete interfacing comprises interfacing of the planting media between the plurality of modular units from a top surface of the planting media to the base layer.

20. The method of claim 17, wherein each base layer includes at least one channel connecting two or more of the plurality of reservoirs.

* * * * *